(12) United States Patent
Leany et al.

(10) Patent No.: US 7,255,318 B2
(45) Date of Patent: Aug. 14, 2007

(54) STUD MOUNTING SYSTEM

(75) Inventors: Thaylen K. Leany, Fort Wayne, IN (US); Lynn Edwin Fisher, Fort Wayne, IN (US); Marc D. Pape, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/026,847

(22) Filed: Dec. 21, 2001

(65) Prior Publication Data

US 2003/0116691 A1 Jun. 26, 2003

(51) Int. Cl.
*F16M 1/00* (2006.01)

(52) U.S. Cl. .................... 248/640; 248/603; 310/89

(58) Field of Classification Search ............... 248/603, 248/604, 672, 640, 612, 674, 675, 638; 310/89, 310/91
See application file for complete search history.

(56) References Cited

U.S. PATENT DOCUMENTS

| | | | | |
|---|---|---|---|---|
| 1,930,310 A | * | 10/1933 | Geyer | 248/635 |
| 2,308,962 A | * | 1/1943 | Riesing | 248/605 |
| 3,270,221 A | * | 8/1966 | Shaffer | 248/317 |
| 3,270,222 A | * | 8/1966 | Shaffer | 310/51 |
| 3,746,289 A | * | 7/1973 | Johnsen | 248/674 |
| 3,787,014 A | * | 1/1974 | Story et al. | 248/558 |
| 3,830,595 A | * | 8/1974 | Carpenter et al. | 248/603 |
| 3,834,344 A | * | 9/1974 | Yoshino | 248/635 |
| 3,941,339 A | * | 3/1976 | McCarty | 248/603 |
| 4,155,529 A | | 5/1979 | Maudlin | |
| 4,200,257 A | | 4/1980 | Litch, III | |
| 4,253,634 A | | 3/1981 | Daniels | |
| 4,420,136 A | | 12/1983 | Lau | |
| 4,452,417 A | * | 6/1984 | Krafthefer et al. | 248/604 |
| 4,506,179 A | * | 3/1985 | Chernoff et al. | 248/675 |
| 4,933,809 A | * | 6/1990 | Boede et al. | 361/641 |
| 4,952,831 A | * | 8/1990 | Isozumi et al. | 310/71 |
| 5,035,397 A | * | 7/1991 | Yamada | 180/297 |
| 5,364,062 A | * | 11/1994 | Doyle et al. | 248/674 |
| 5,492,456 A | | 2/1996 | Knight et al. | |
| 5,505,423 A | * | 4/1996 | Kusijanovic | 248/554 |
| 5,718,407 A | * | 2/1998 | Lee | 180/312 |
| 5,752,688 A | * | 5/1998 | Campbell et al. | 248/674 |
| 5,762,313 A | * | 6/1998 | Siemer | 248/635 |
| 5,772,176 A | | 6/1998 | Keck et al. | |
| 6,005,314 A | * | 12/1999 | Fisher et al. | 310/66 |
| 6,142,839 A | | 11/2000 | Wilcox | |
| 6,241,294 B1 | * | 6/2001 | Young et al. | 292/251.5 |
| 6,378,832 B1 | * | 4/2002 | Li et al. | 248/635 |
| 6,499,714 B1 | * | 12/2002 | Wike | 248/632 |
| 6,528,916 B1 | * | 3/2003 | Naito et al. | 310/71 |
| 6,593,674 B2 | * | 7/2003 | Sanchez et al. | 310/89 |
| 2001/0015586 A1 | * | 8/2001 | Honorio et al. | 310/89 |

(Continued)

*Primary Examiner*—Amy J. Sterling
*Assistant Examiner*—Steven Marsh
(74) *Attorney, Agent, or Firm*—Rodney M. Young; Armstrong Teasdale LLP

(57) ABSTRACT

A housing for a motor is described. The housing extends between a pair of endshields and includes an inner surface, an outer surface, and at least one raised projection extending outwardly from at least one of the housing inner and outer surfaces. The projection includes at least one opening extending therethrough and at least one fastener configured to attach to the inner surface and extend outwardly through the housing opening.

19 Claims, 4 Drawing Sheets

U.S. PATENT DOCUMENTS

2002/0047406 A1* 4/2002 Jessberger .................... 310/91
2002/0117908 A1* 8/2002 Sanchez et al. ............... 310/51
2002/0190593 A1* 12/2002 Franz et al. .................. 310/91
2003/0067232 A1* 4/2003 Coonrod ...................... 310/89
2003/0098622 A1* 5/2003 Lino ........................... 310/89

* cited by examiner

STUD MOUNTING SYSTEM

BACKGROUND OF THE INVENTION

This invention relates generally to motors, and more particularly, to mounting systems for motors.

At least some known mounting systems for motors include a plurality of bolts attached to an outer surface of a motor housing surrounding the motor. To enable the motor to be attached within an application, such as a refrigerator, the bolts extend radially outwardly from the motor and are spaced circumferentially around the motor housing.

During motor operation, the mounting systems are not only subjected to stresses from supporting the weight of the motor, but vibrational stresses may also be induced into the mounting system by the operating motor, and/or the operation of the associated attachment. Furthermore, because such motors are typically used to power other rotational equipment, the rotation of such equipment may also induce vibrational stresses into the motor mounting system.

Over time, such vibrational stresses may cause the mounting system hardware to loosen. Furthermore, continued operation may eventually cause premature failure of the mounting system. To facilitate preventing motor mounting system failure, complex mounting systems including structurally re-inforced attachment points are often used. However, because different applications require different motors, each motor includes a different mounting system, and as a result, fabrication costs associated with such motors may be increased.

BRIEF SUMMARY OF THE INVENTION

In one aspect, a housing for a motor is provided. The housing extends between a pair of endshields and includes an inner surface, an outer surface, and at least one raised projection extending outwardly from at least one of the housing inner and outer surfaces. The projection includes at least one opening extending therethrough and at least one fastener configured to attach to the inner surface and extend outwardly through the housing opening.

In another aspect, a method for mounting a motor to a support using a mounting system is provided. The method employs a mounting system having a plurality of fasteners, a motor having a pair of endshields and a housing extending therebetween. The housing includes a plurality of openings. The method includes attaching the fasteners to an inner surface of the housing using a plurality of attachment points within the housing, such that the fasteners extend radially outwardly from the housing, and attaching the motor to the support using the plurality of fasteners.

In another aspect, a motor including a pair of endshields, a housing extending between the endshields is provided. The motor includes at least one raised projection extending outwardly from the housing, the projection includes at least one opening extending therethrough and at least one fastener configured to attach to the housing and extend outwardly through the housing. The motor also includes a stator-rotor assembly mounted in the housing.

DETAILED DESCRIPTION OF THE INVENTION

Figure 1:
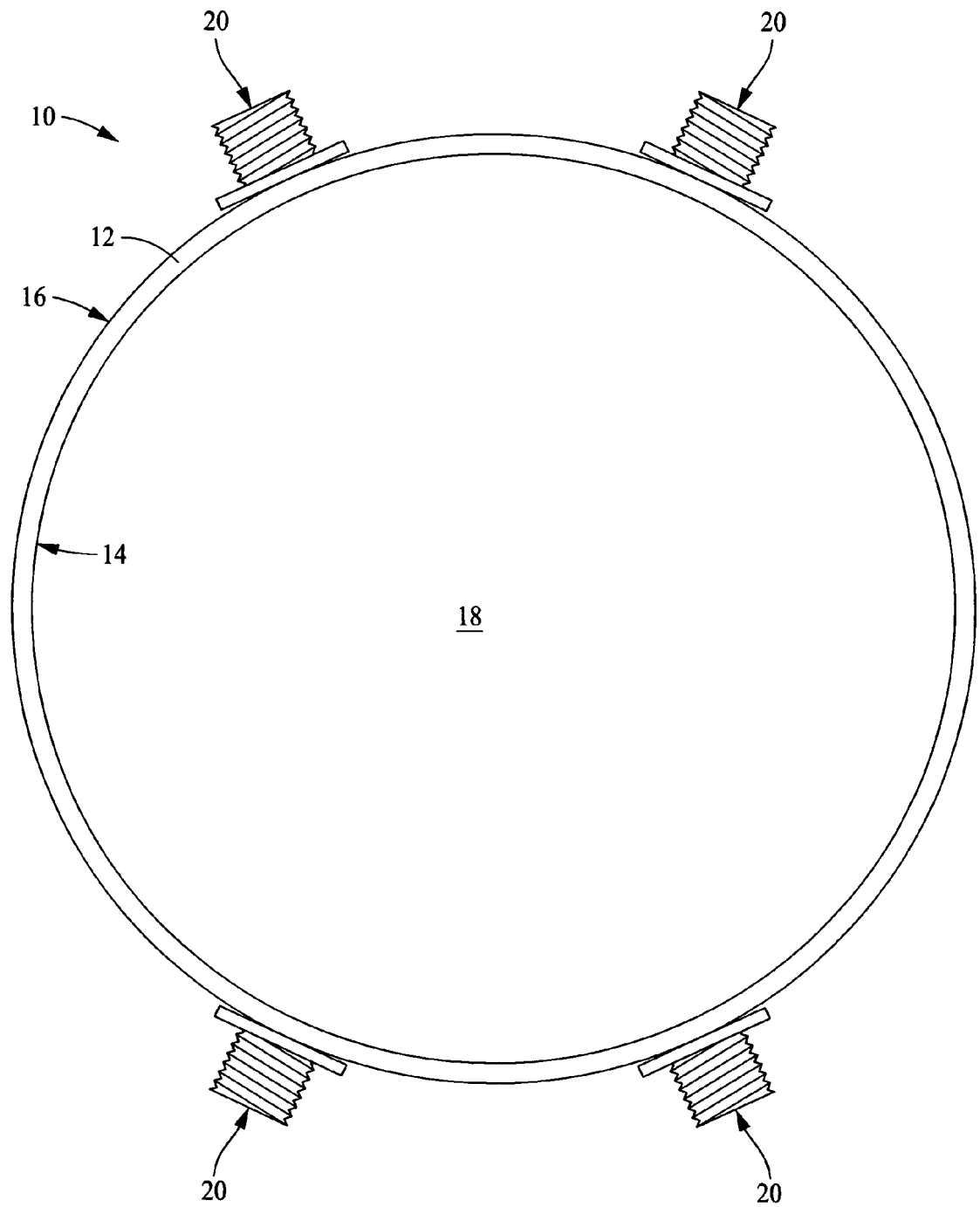
FIG. 1 is a side view of a known motor housing.

FIG. 1 a side view of a known motor housing 10 including a shell 12 having an inner surface 14 and an outer surface 16. Shell 12 defines a cavity 18 therein in which a motor (not shown) is housed. A plurality of mounting hardware or fasteners 20 are attached to shell outer surface 16 and extend radially outwardly from shell outer surface 16. More specifically, fasteners 20 are spaced circumferentially around housing 10, and in the exemplary embodiment, are welded to shell outer surface 16.

Figure 2:
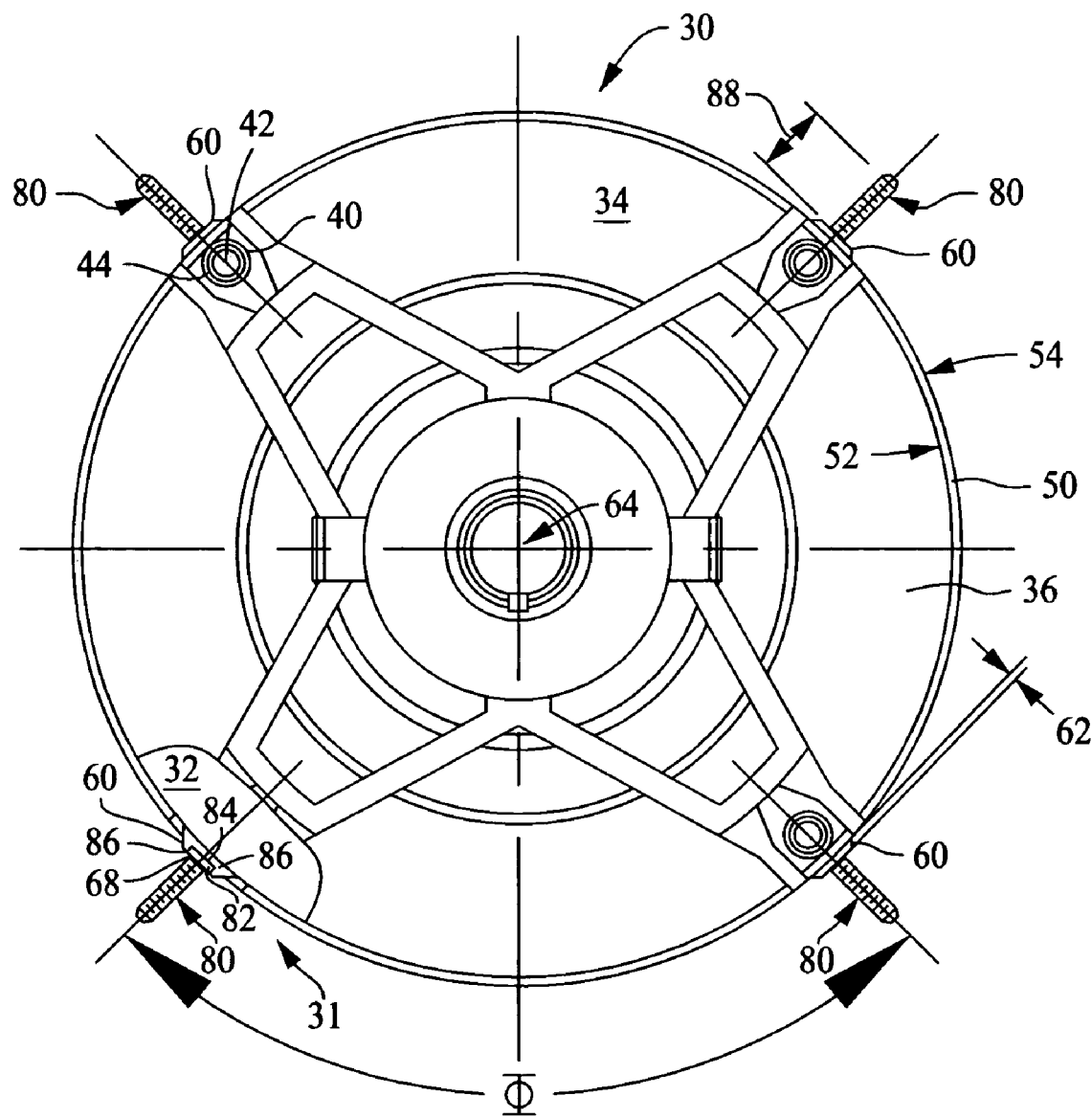
FIG. 2 is a side view of a motor housing.
Figure 3:
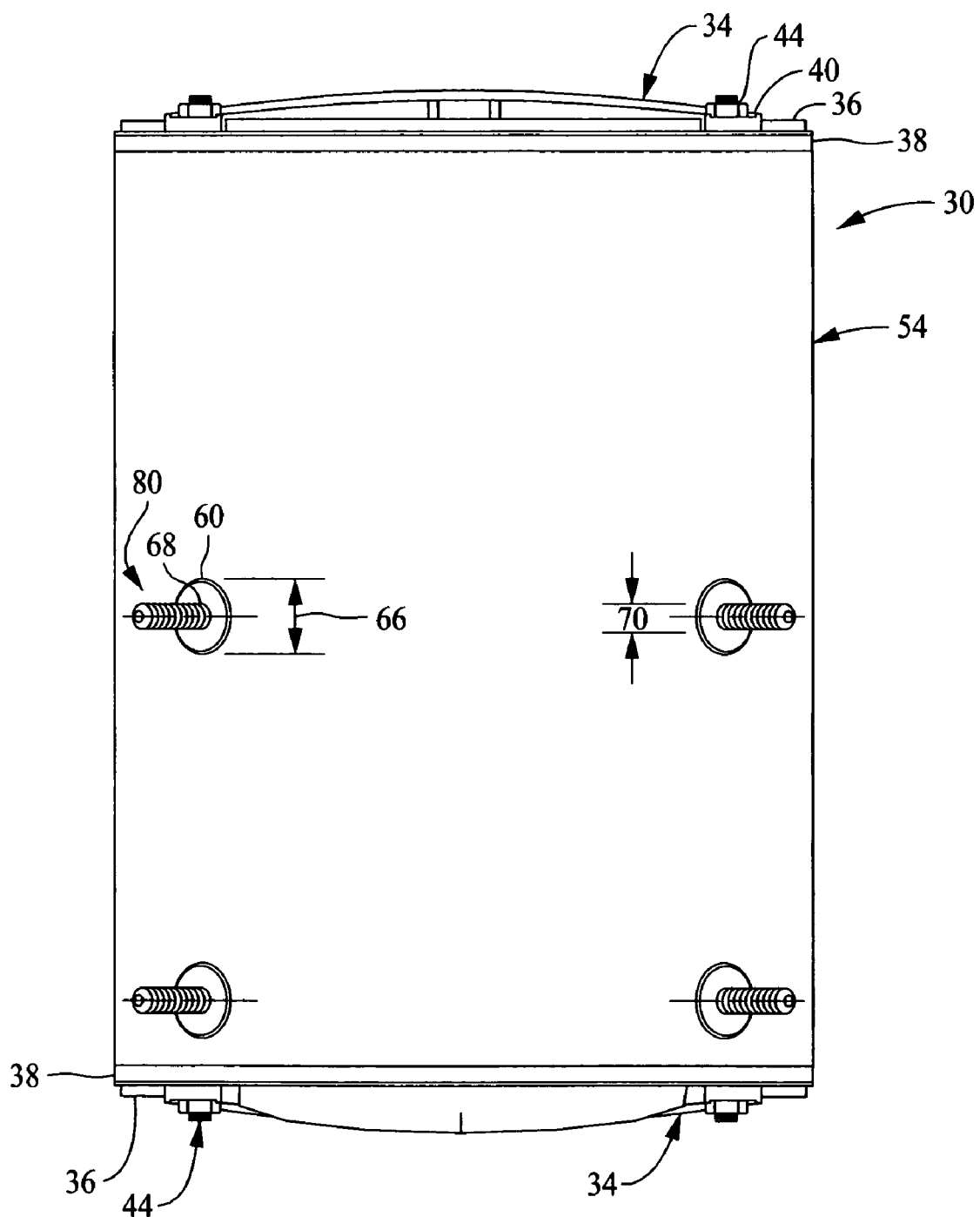
FIG. 3 is a perspective view of the motor housing shown in FIG. 2.

FIG. 2 is a side view of a motor housing 30 including a mounting system 31. FIG. 3 is a perspective view of housing 30. Housing 30 extends circumferentially around a motor (not shown). In the exemplary embodiment, the motor is housed within a cavity 32 defined by housing 30 and a pair of endshields 34. In one embodiment, the motor is used in a heating, ventilation, and air conditioning system.

In the exemplary embodiment, endshields 34 are identical, and each has a bottom 36 and a sidewall 38 extending substantially perpendicular from an outer periphery of bottom 36. Sidewall 38 has, but is not limited to, a substantially circular cross-sectional profile. A plurality of openings 40 are disposed within each endshield 34. Openings 40 have a diameter 42 sized to receive fasteners 44 used to couple endshield 34 to housing 30. In the exemplary embodiment, openings 40 are spaced circumferentially around the outer periphery of endshield bottom 36.

Housing 30 includes a shell 50, an inner surface 52, and an outer surface 54. Shell 50 is substantially cylindrical and extends between endshields 34 such that motor cavity 32 is defined between motor housing 30 and endshields 34. Mounting system 31 is formed integrally with housing 30 and includes a plurality of raised projections 60 that extend from housing outer surface 54 a distance 62. In the exemplary embodiment, projections 60 are formed integrally with housing 30.

Projections 60 are spaced circumferentially around housing 30 such that adjacent projections 60 are equi-spaced at an angle Φ measured with respect to a center axis of symmetry 64 of the motor, and with respect to each other. In the exemplary embodiment, angle Φ is approximately ninety degrees and housing 30 includes four projections 60 in the same cross-sectional plane. In an alternative embodiment, angle Φ is less than ninety degrees, and housing 30 includes more than four projections 60 in the same cross-sectional plane. In a further alternative embodiment, angle Φ is more than ninety degrees, and housing 30 includes less than four projections 60 in the same cross-sectional plane. In yet another embodiment, projections 60 are not equi-spaced circumferentially around housing 30.

In the exemplary embodiment, projections 60 are identical, and each projection has an outer diameter 66. In an alternative embodiment, projections 60 are non-identical and are sized differently. An opening 68 extends substantially concentrically through each projection 60. Each opening 68 has a diameter 70 that is sized to receive a fastener 80 therethrough. Fastener 80 enables housing 30 to be coupled to an applicable support (not shown). In the exemplary embodiment, each fastener 80 is threaded and includes a head 82 including a top surface 84 and a bottom surface 86.

Each respective projection 60 is sized to receive fastener head 82 such that head top surface 84 is substantially co-planar with housing inner surface 52 when fastener 80 is fully installed within each projection 60.

In the exemplary embodiment, each respective projection 60 is sized to receive fastener head 82 such that head bottom surface 86 is substantially flush with housing inner surface when fastener 80 is fully installed within each projection 60. In an alternative embodiment, head bottom surface 86 is welded to housing inner surface.

Figure 4:
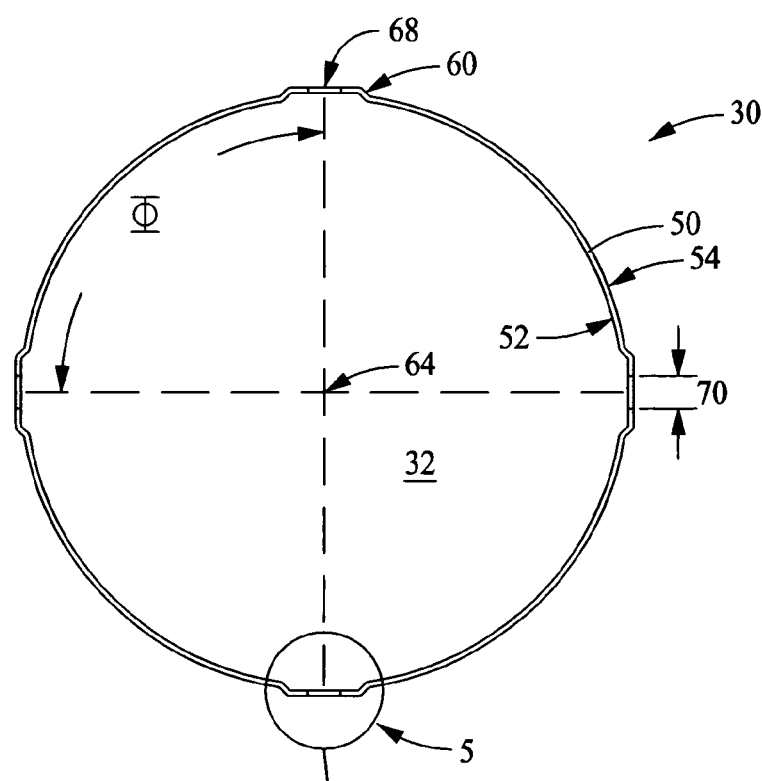
FIG. 4 is a cross-sectional view of the motor housing shown in FIG. 2.
Figure 5:
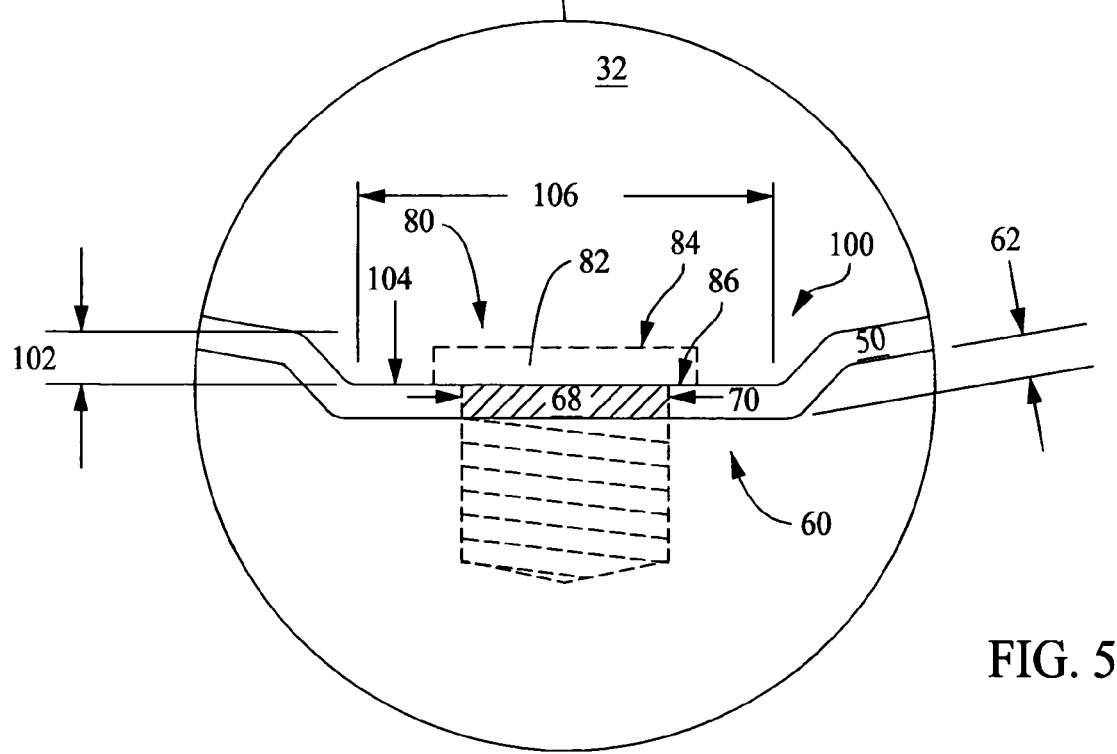
FIG. 5 is an enlarged view of the motor housing shown in FIG. 4 taken along area 5 shown in FIG. 4.

FIG. 4 is a cross-sectional view of motor housing 30 shown in FIG. 2. FIG. 5 is an enlarged view of the motor housing 30 shown in FIG. 4 taken along area 5 shown in FIG. 4. Each projection 60 extends a distance 62 from outer surface 54 such that a recess 100 defined therein. Recess 100 includes a depth 102 and inner surface 104 with a diameter 106. Recess depth 102 is sized to receive fastener head 82 such that fastener head top surface 84 is substantially co-planar with housing inner surface 52. Recess inner surface 104 is substantially parallel to shell 50 such that when fastener 80 is installed head bottom surface 86 is substantially flush with inner surface 104. Opening 68 extends substantially concentrically through recess 100. Each opening 68 has a diameter 70 that is sized to receive fastener 80 therethrough.

Projection 60 extends from inner surface 52 and outer surface 54 a distance 62. In the exemplary embodiment, recess 100 is sized to receive a fastener head 82 such that head 82 is disposed substantially co-planar within recess 100 and does not protrude into cavity 32 and fastener 80 extends radially through opening 68. Disposing head 32 substantially co-planar within recess 100 facilitates ease of insertion of the motor into housing 30.

The above described motor housing mounting system for securing a motor to a support is cost-effective and reliable. Each projection 60 includes a recess configured to provide a greater surface area for fastener attachment, and thus greater stability against typical vibrational stresses of motors. In the exemplary embodiment, the recess is crimped to the fasteners to facilitate fastener retention during operation of the motors and provide additional structural support to the fasteners. In an alternative embodiment, the fasteners are welded to the recess. The practice of disposing the fastener through the housing opening supports the fastener and reduces the chance of premature failure of the mounting system.

While the invention has been described in terms of various specific embodiments, those skilled in the art will recognize that the invention can be practiced with modification within the spirit and scope of the claims.

What is claimed is:

1. A method for mounting a motor to a support, said method comprising:
providing a mounting system, the mounting system including a plurality of fasteners, the motor including a pair of endshields and a housing extending therebetween, the housing including a plurality of recessed openings, an outer surface, an inner surface, a housing body extending between the inner surface and the outer surface, and a plurality of raised projections, wherein each of the projections has a thickness that is equal to a thickness of the housing body;
attaching the fasteners through the openings formed in the housing, such that the fasteners extend radially outwardly through the housing and a head of the fasteners is substantially co-planar with an un-recessed portion of the inner surface of the housing and such that the head of the fasteners remain positioned between rotating components of the motor and the housing outer surface, wherein attaching the fasteners further comprises inserting each of the fasteners through a respective one of the plurality of raised projections such that the fasteners extend radially outwardly from the housing; and
attaching the motor to the support using the plurality of fasteners.

2. A method in accordance with claim 1 wherein the plurality of raised projections are circumferentially spaced 90 degrees about the housing, each of the plurality of openings disposed within a respective raised projection, attaching the fasteners further comprising inserting each respective fastener through the respective housing raised projection.

3. A method in accordance with claim 1 wherein attaching the fasteners further comprises crimping the fasteners to the inner surface of the housing.

4. A motor housing configured to receive a motor extending between a pair of endshields, said housing comprising:
an inner surface;
an outer surface, said inner surface configured to extend between a rotating component of the motor and said outer surface;
a housing body extending between said inner surface and said outer surface, said body comprising a thickness;
a plurality of raised projections extending radially outwardly from at least one of said housing inner surface and said housing outer surface defining a recess with respect to said housing inner surface of the housing body including an assembly of the rotating component and a stator of the motor, each of said plurality of raised projections comprising at least one opening extending therethrough, each of said plurality of raised projections comprising an inner surface and a thickness equal to said housing body thickness; and
at least one fastener having a top surface, said at least one fastener extends outwardly through said housing opening such that said top surface is substantially co-planar with an un-recessed portion of said housing inner surface.

5. A housing in accordance with claim 4 wherein each of said plurality of raised projections, are spaced circumferentially.

6. A housing in accordance with claim 4 wherein adjacent projections of said plurality of raised projections spaced circumferentially 90 degrees about the housing.

7. A housing in accordance with claim 4 wherein said housing comprises a cylindrical body.

8. A housing in accordance with claim 4 wherein said inner surface of said at least one of said plurality of raised projections comprises at least one attachment point.

9. A housing in accordance with claim 4 wherein said inner surface of each of said plurality of raised projections comprises a plurality of attachment points configured to receive a fastener.

10. A housing in accordance with claim 4 wherein said housing comprises a plurality of fasteners configured to attach to said inner surface of one of said plurality of raised projections such that said fasteners extend outwardly from said housing.

11. A housing in accordance with claim 4 wherein said at least one fastener is attached to said housing inner surface by at least one of a weld, a crimp, and an adhesive.

12. A housing in accordance with claim 4 wherein said at least one fastener is attached to said inner surface of at least one of said plurality of raised projections such that said fasteners are disposed inside said housing inner surface.

13. A motor comprising:
a pair of endshields;
a housing extending between said endshields and including an assembly of a stator and a rotor, wherein said housing includes a plurality of raised projections extending outwardly from said housing, said housing comprising an outer surface, an opposite inner surface, and a body extending therebetween, said body comprising a thickness, each of said plurality of raised projections defining a recess with respect to said housing inner surface and comprising an inner surface and a thickness equal to said housing body thickness, at least one opening extending through said recess, and at least one fastener having a top surface, said at least one fastener extends radially outwardly through said housing such that said top surface is substantially co-planar with said inner surface;
wherein said housing inner surface extends between said stator-rotor assembly and said housing outer surface.

14. A motor in accordance with claim 13 wherein each of said plurality of projections spaced circumferentially 90 degrees about the housing.

15. A motor in accordance with claim 13 wherein said housing is substantially cylindrically shaped.

16. A motor in accordance with claim 13 wherein each of said plurality of raised projections comprises a plurality of attachment points configured to receive a fastener.

17. A motor in accordance with claim 13 further comprising a plurality of fasteners configured to contact said inner surface of each of said plurality of raised projections and extend outwardly from said housing through said opening.

18. A motor in accordance with claim 17 wherein said plurality of fasteners are attached to said inner surface of a corresponding one of said plurality of raised projections by at least one of a weld, a crimp, and an adhesive.

19. A motor in accordance with claim 13 wherein said at least one fastener contacts said inner surface of a corresponding one of said plurality of raised projections such that a head of said at least one fastener is substantially co-planar with said housing inner surface.

* * * * *